United States Patent
Bais et al.

(10) Patent No.: US 11,411,835 B2
(45) Date of Patent: Aug. 9, 2022

(54) COGNITIVE MODEL DETERMINING ALERTS GENERATED IN A SYSTEM

(71) Applicant: Larsen & Toubro Infotech Ltd, Mumbai (IN)

(72) Inventors: Chetan Bais, Pune (IN); Jnanendra Prasad Sarkar, Pune (IN); Mohammed Vaghjipurwala, Pune (IN); Mustafa Neemuchwala, Pune (IN); Rakesh Nainani, Pune (IN); Sachin Vyas, Pune (IN); Satish Saluja, Pune (IN); Vaibhav Laturkar, Pune (IN); Vinayak Satpute, Pune (IN); Vishal Raut, Pune (IN)

(73) Assignee: Larsen & Toubro Infotech Ltd, Mumbai (IN)

(*) Notice: Subject to any disclaimer, the term of this patent is extended or adjusted under 35 U.S.C. 154(b) by 0 days.

(21) Appl. No.: 17/214,007

(22) Filed: Mar. 26, 2021

(65) Prior Publication Data
US 2022/0131766 A1    Apr. 28, 2022

(51) Int. Cl.
| H04L 12/00 | (2006.01) |
| H04L 41/16 | (2022.01) |
| H04L 41/12 | (2022.01) |
| H04L 41/14 | (2022.01) |
| G06N 20/20 | (2019.01) |
| H04L 41/0631 | (2022.01) |
| H04L 41/5074 | (2022.01) |
| H04L 41/0604 | (2022.01) |

(52) U.S. Cl.
CPC ............ *H04L 41/16* (2013.01); *G06N 20/20* (2019.01); *H04L 41/0604* (2013.01); *H04L 41/0631* (2013.01); *H04L 41/12* (2013.01); *H04L 41/14* (2013.01); *H04L 41/5074* (2013.01)

(58) Field of Classification Search
CPC ..... G06N 20/20; H04L 41/5074; H04L 41/14; H04L 41/12; H04L 41/0631; H04L 41/0604; H04L 41/16
USPC .................................................. 709/223–224
See application file for complete search history.

(56) References Cited

U.S. PATENT DOCUMENTS

| 7,694,115 B1* | 4/2010 | Porras ................. H04L 63/1408 709/224 |
| 2005/0228847 A1* | 10/2005 | Hayes, Jr. ............... H04W 4/50 709/200 |

(Continued)

FOREIGN PATENT DOCUMENTS

| CN | 101087213 A | * 12/2007 | ............. H04L 12/00 |
| CN | 207993218 U | * 10/2018 | ............. H04L 12/00 |

*Primary Examiner* — Frantz Coby
(74) *Attorney, Agent, or Firm* — Farrell Patent Law PC; Mark Farrell

(57) ABSTRACT

The present invention discloses a system and method with associated feature capabilities for analyzing and resolving tickets raised in an IT environment. The system monitors health of multiple assets included in the environment and in case an alert is triggered, the system further analyses the alert and provides a recommendation on conversion of the alert to an incident ticket. The incident ticket can also be reported manually by human. Such tickets are then categorized based on certain influencing factors. To this end, a best possible resolution for each incident ticket is then recommended. Subsequently, automatic resolution scripts are identified intelligently and automatically to resolve the problem.

30 Claims, 9 Drawing Sheets

(56) References Cited

U.S. PATENT DOCUMENTS

| | | | |
|---|---|---|---|
| 2010/0100778 A1* | 4/2010 | Sullivan | H04L 41/0806 |
| | | | 709/224 |
| 2010/0235688 A1* | 9/2010 | Bennah | G06F 11/0706 |
| | | | 714/57 |
| 2013/0049948 A1* | 2/2013 | Ali | G06Q 30/0629 |
| | | | 340/501 |
| 2013/0159763 A1* | 6/2013 | Bennah | G06F 11/0766 |
| | | | 714/E11.073 |
| 2018/0114456 A1* | 4/2018 | Black | G09B 7/00 |
| 2020/0196129 A1* | 6/2020 | Chapados | H04W 4/90 |
| 2021/0133081 A1* | 5/2021 | Kelly | G06F 11/327 |

* cited by examiner

COGNITIVE MODEL DETERMINING ALERTS GENERATED IN A SYSTEM

TECHNICAL FIELD OF THE DISCLOSURE

The present invention discloses a system and method associated feature capabilities for analyzing and resolving tickets raised in an IT environment. The system monitors health of multiple assets included in the environment and in case an alert is triggered, the system further analyses the alert and provides a recommendation on conversion of the alert to an incident ticket. Such tickets are then categorized based on certain pre-defined parameters influencing dimensions. To this end, a best possible resolution for each incident ticket is then recommended.

BACKGROUND

Any organization these days is heavily dependent on functioning of IT assets. Success and growth of the organization is proportional to smooth working of network assets in tandem with individual assets. Therefore, a robust asset management system is must for the organization. With rise of artificial intelligence and machine learning, systems have been developed that automatically takes care of asset management of the organization. In case an asset is showing certain parameters pointing towards an irregular behavior, an alert is generated at source system, and the management system is automatically notified of the alert. The system then evaluates the alert and decides upon creating a ticket out of it. Further, a resolution for the ticket is provided automatically. With an automated flow like this, there is still a considerable scope of improvement as ticket categorization and relationship establishment with root cause of problem is not done. Hence, the asset is wrongly identified as the problem.

A U.S. patent U.S. Pat. No. 8,041,799B1 discloses a method of forming historical alert tables. Data related to alerts is stored in the tables and is useful in identifying trends and troubles areas. The reference further discloses ranking of alerts. The reference describes parent child relationship between alerts in detail. The relationship helps in identifying root cause of the alerts.

Further U.S. Pat. No. 7,917,393B2 discloses a method determining probabilistic correlation between alerts. The prior art discloses establishing a relationship between new and historical alerts.

Further, IBM Watson discloses a method with machine learning and natural language processing for tackling IT related issues. Watson discloses establishing similarity between new alerts with that of the alerts in the past. Watson also discloses natural language processing to understand content in tickets and provide resolution accordingly.

Further, application WO2020002772A1 discloses an automated system for network control and monitoring. The system describes automatic analyzing of received alerts based on one or more alert patterns. Basis this analysis a prediction alert is formulated. The prediction alert determines whether a suitable action is required on the alert or not. The system further describes reducing number of received alerts and categorizing different alerts. Further, prioritization of the received alerts is done. The system then automatically decides on what actions are to be taken on the alerts.

Further, a non-patent literature "A System for Ticket Analysis and Resolution" describes a ticket analysis and resolution system. The system works in an automated manner and provides for a best resolution with understanding the ticket from historical data. The system also describes creating an event out of an alert and then creating a ticket of that event. The system also discloses clustering of tickets.

Further U.S. Pat. No. 10,459,951B2 discloses a method determining automated sequences for resolution of a ticket. The method describes formation of ticket clusters based on information provided about the ticket, user actions and time at which the ticket is logged by the user. An automation system then determines automation sequences for resolution of the ticket.

In the existing approach, considering topological data, network analysis, association probability and time difference between alerts, a parent-child relationship is established. The relationship helps in identifying the root cause of the problem. Further, when the ticket is generated or converted from the alert or incident ticket reported manually by a human, it can be classified as technical and functional and further granular technical category. This classification significantly improves finding appropriate resolution quickly. Subsequently, standard operating procedures are automatically identified and mapped to the ticket. Further, resolution scripts are identified intelligently and triggered automatically for resolving the tickets. Existing solutions do not provide these features.

There is no solution providing for features such as topological analysis, association probability, time window analysis, categorizing of tickets into functional/and technical, recommendation on standard operating procedures and automatic intelligence triggering of scripts. Hence, the present solution is more advanced.

SUMMARY

One or more shortcomings of prior art are overcome, and additional advantages are provided through present disclosure. Additional features are realized through techniques of the present disclosure. Other embodiments and aspects of the disclosure are described in detail herein and are considered a part of the present disclosure.

In one aspect of the disclosure, a method to establish correlation between alerts to identify a parent child relationship is disclosed. Further, identifying tickets from the alerts and categorizing into functional and technical level to execute automated scripts to provide resolution is disclosed. The relationship is established between real time alerts and alerts from historical data. Considering the relationship and applying trained algorithms, a correlation probability is calculated. Considering topological analysis, associative probability and time difference between the alerts, a weightage score is established. Further, ranking of alerts is performed basis the probability and the weightage score. Considering the topological analysis, associativity along with pattern recognition and customized business rules the parent child relationship between the alerts is established. Once the parent child relationship is established by above methodology, parent alert is identified for primary incident ticket and child tickets from child alerts are associated with the primary ticket for further processing. Identification of problem in the ticket either converted from system generated alert or incident reported manually by human is performed by applying text pre-processing, vectorization, ensemble of machine learning models and post processing to categorize the ticket at functional and technical level (C1 & C2). Further, recommendation on SOP is provided considering mapping the problem to SOP documents and considering latest SOPs. Finally, triggering of scripts is performed by automatically considering parameters for mapping to the ticket and contextual analysis to identify infrastructure or network devices or software application etc.

In another aspect of the disclosure, a system for determining alerts generated is disclosed, wherein the system comprises of a receiver receiving alerts from a monitoring tool. The alerts are then passed through a normalizing unit where an alert type column from the alerts is distinguished and a categorization prediction algorithm is applied to predict a normalized category for the alerts. Further, a relationship unit to identify a relation by looking up the alerts with historical alert data, wherein the relationship unit determines a pattern associativity from the relation and the normalized category. Further, a probability unit calculates a probability basis the pattern associativity on the alerts and determines ranking of the alerts. A hierarchical unit performs functions to determine a parent alert and a child alert. A categorization unit then categorizes tickets formed by a ticketing unit into functional level and technical level. Finally, a recommendation unit suggests SOPs for the tickets and triggers scripts automatically to provide resolution for the tickets.

Foregoing summary is illustrative only and is not intended to be in any way limiting. In addition to illustrative aspects, embodiments, and features described above, further aspects, embodiments, and features will become apparent by reference to drawings and following detailed description.

DETAILED DESCRIPTION

Figure 1:
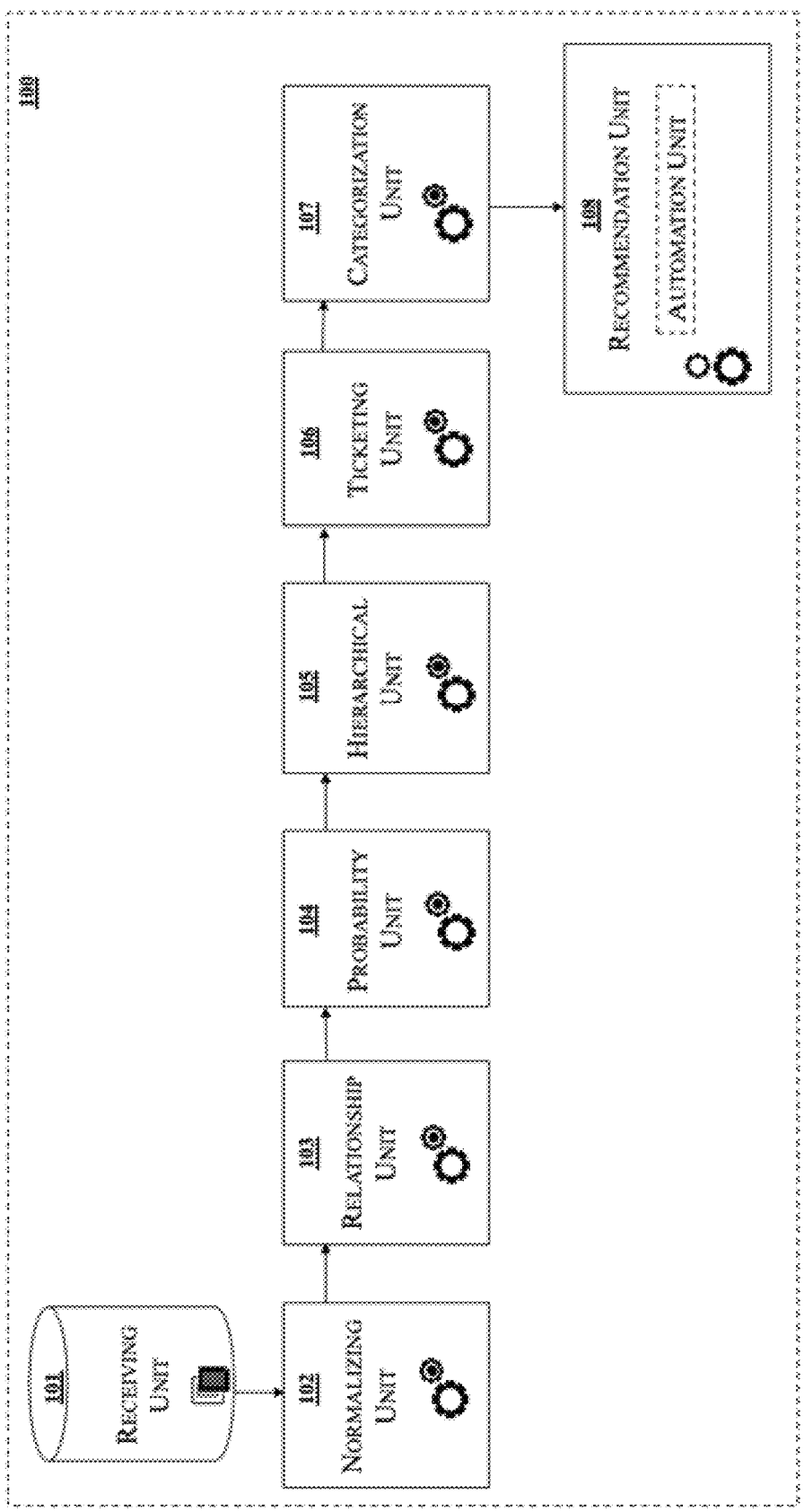
FIG. 1 is a diagram representing a system for determining alerts.

In following detailed description of embodiments of present disclosure, numerous specific details are set forth in order to provide a thorough understanding of the embodiments of the disclosure. However, it will be obvious to one skilled in art that the embodiments of the disclosure may be practiced without these specific details. In other instances, well known methods, procedures, components, and circuits have not been described in detail so as not to unnecessarily obscure aspects of the embodiments of the disclosure.

References in the present disclosure to "one embodiment" or "an embodiment" mean that a feature, structure, characteristic, or function described in connection with the embodiment is included in at least one embodiment of the disclosure. Appearances of phrase "in one embodiment" in various places in the present disclosure are not necessarily all referring to same embodiment.

In the present disclosure, word "exemplary" is used herein to mean "serving as an example, instance, or illustration." Any embodiment or implementation of present subject matter described herein as "exemplary" is not necessarily to be construed as preferred or advantageous over other embodiments.

The present disclosure may take form of a hardware embodiment, a software embodiment, or an embodiment combining software and hardware aspects that may all generally be referred to herein as a 'system' or a 'module'. Further, the present disclosure may take form of a computer program product embodied in a storage device having computer readable program code embodied in a medium.

While the disclosure is susceptible to various modifications and alternative forms, specific embodiment thereof has been shown by way of example in drawings and will be described in detail below. It should be understood, however, that it is not intended to limit the disclosure to the forms disclosed, but on contrary, the disclosure is to cover all modifications, equivalents, and alternative falling within scope of the disclosure.

Terms such as "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude existence of other elements or additional elements in the system or apparatus.

In following detailed description of the embodiments of the disclosure, reference is made to drawings that form a part hereof, and in which are shown by way of illustration specific embodiments in which the disclosure may be practiced. These embodiments are described in enough detail to enable those skilled in the art to practice the disclosure, and it is to be understood that other embodiments may be utilized and that changes may be made without departing from the scope of the present disclosure. The following description is, therefore, not to be taken in a limiting sense.

In recent era, deployment of IT infrastructure has witnessed a vertical growth. With the growth problems arising in IT systems have also increased. The present invention discloses a method and a system for resolving issues arising in the IT infrastructure. The issues in form of alerts are generated in an IT environment. The alerts are received, and unwanted noise is segregated from the alerts. The alerts are then correlated by applying certain algorithms. Further, tickets are generated from the alerts and a parent-child relationship is established. A parent alert signifies root cause of a problem and a child alert signifies impact of the problem. Then a parent ticket and a child ticket are generated, and both the tickets are further classified as at functional level and technical level. Finally, standard operating procedures are applied to resolve the tickets.

Figure 1A:
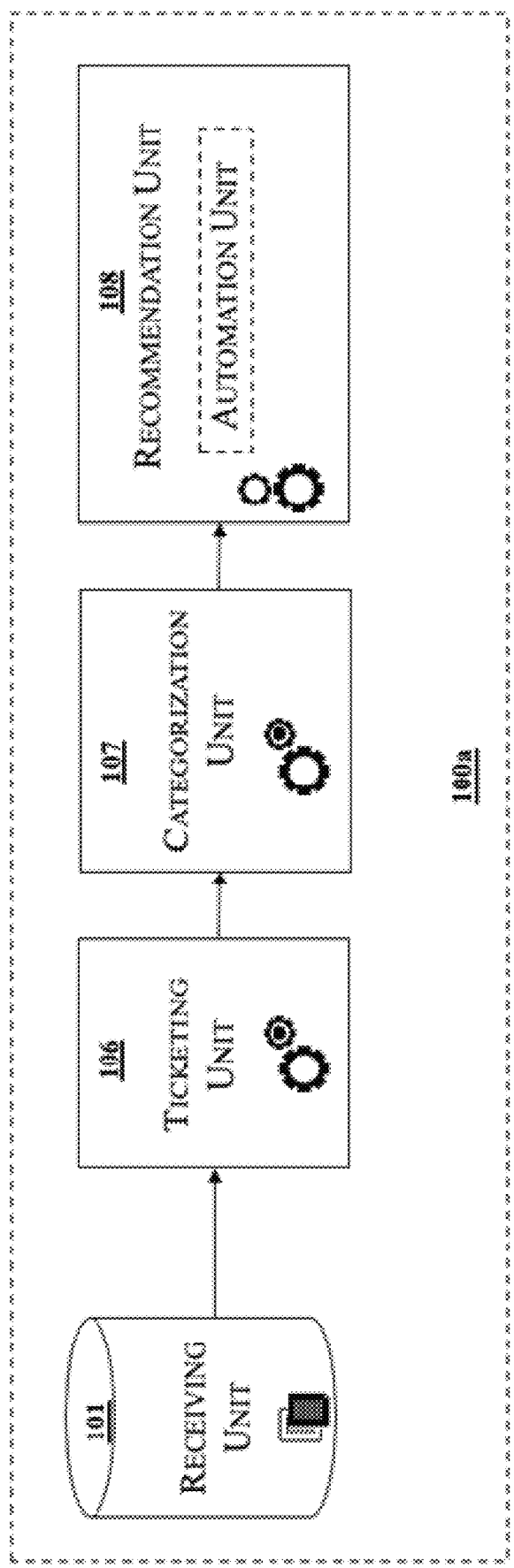
FIG. 1a is a diagram representing a system for determining user alerts.

FIG. 1 explains a system 100 for determining the alerts. A receiving unit 101 receives the alerts. A normalizing unit 102 applies a machine learning supervised predictive model predicting a normalized alert category type based on raw alert information thus producing normalized alerts. The normalized alerts are then passed onto a relationship unit 103. The relationship unit draws a relationship between the normalized alerts by comparing the alerts with historical alerts. Once the relationship is established, a pattern associativity is established from the relationship and the normalized alert category. Further, a probability for the alerts is determined by a probability unit 104. The probability unit 104 takes into consideration the pattern associativity and a weighted score. Ranking of the alerts is determined basis the probability. Further, a hierarchical unit 105, considering network analysis derived from topology data 601, the associativity 603 derived from pattern recognition 604 and customized business rules 605 determines one or more parent alert(s) and one or more child alert(s). A ticketing unit 106 then creates a parent ticket 702 and a child ticket 702 (*a,b,c*). Further, a categorization unit 107, categorizes the parent ticket, the child ticket and any incident ticket manually reported by humans into a functional level and a technical level. Finally, a recommendation unit 108 inclusive of an automation unit, recommends standard operating procedures and triggers scripts automatically to resolve the ticket. FIG. 1*a* explains a scenario 100*a* in which ticketing unit 106 directly receives alerts from the receiving unit 101. The alerts are user generated alerts and the ticketing unit 106 generates tickets for such alerts and passes the tickets to the categorization unit 107.

Figure 2:
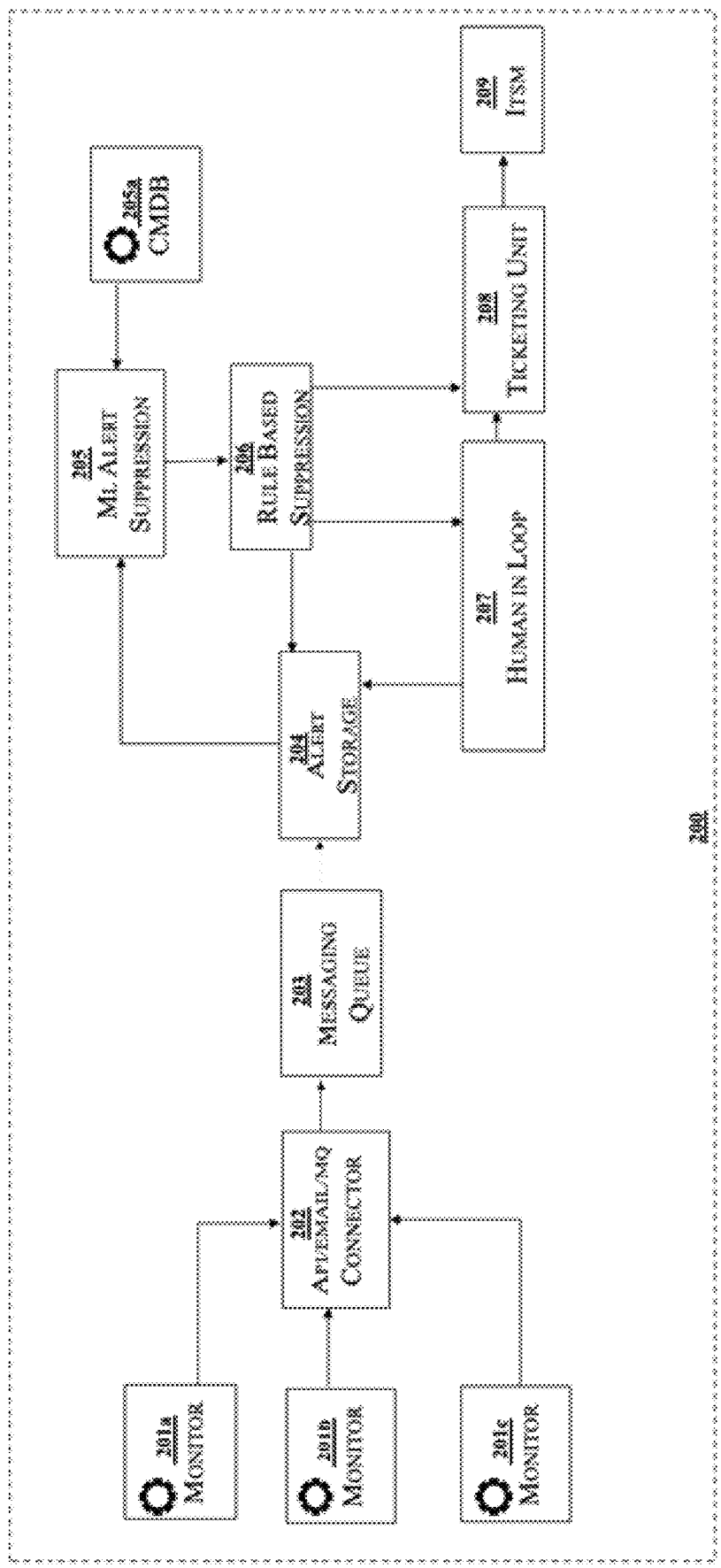
FIG. 2 is a diagram representing a system for alert aggregation, noise suppression and ticketing.

In an embodiment, FIG. 2 explains a system 200 for alert aggregation, noise suppression and ticketing. 201*a*, 201*b* and 201*n* represent monitors where the alerts are generated. At 202, all alert types are connected by a connector. Further, via a messaging queue 203, the alerts are passed onto a storage unit 204. The alerts are then moved for noise suppression to a machine learning noise suppression unit 205. A CMDB unit 205*a* is also connected to the noise suppression unit. After refining from 205, the alerts are then moved to a business rule-based suppression unit 206, where further unwanted alerts are suppressed based on predefined business rules. The alerts are then passed onto a ticketing unit 208 with a human in loop unit 207 also providing a feedback to the ticketing unit. The ticketing unit 208 generates tickets and passes the tickets to IT management system for categorization and resolution.

Figure 3:
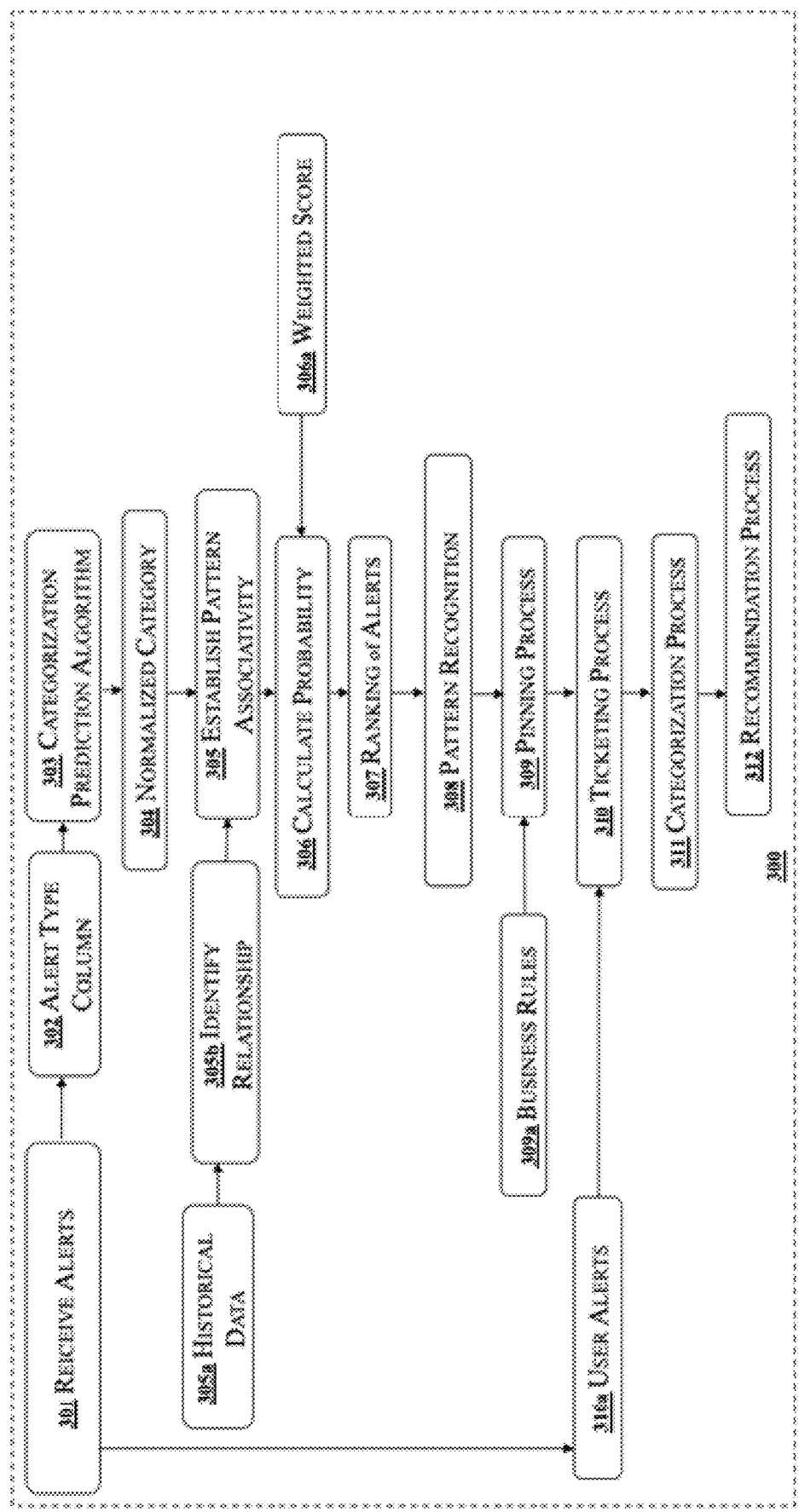
FIG. 3 is a flow diagram representing a method for determination of alerts in a system.

FIG. 3 explains a detailed method 300 of determination of alerts in a system. At step 301, the alerts are received in the system. An alert column type is determined at step 302. A categorization prediction algorithm is applied at step 303 to determine a normalized category at step 304. Further, from historical data 305*a* after identifying relationship 305*b*, pattern associativity is determined at step 305. Probability is then calculated at 306 from weighted score 306*a* and the pattern associativity 305. Based on the probability, ranking of the alerts is performed at 307. At step 308, pattern recognition is applied on alerts to determine pattern between the alerts. To determine a parent alert and a child alert, pinning process 309 is performed. Pinning process includes combination of topology data, network analysis, the associativity, the pattern recognition and customized business rules. A ticketing process 310, creates a parent ticket and associated child ticket. The ticketing process 310 also receives inputs from 310*a* where user alerts are passed onto for ticket creation. The categorization process 311 then determines a functional level C1 and a technical level C2 for the parent ticket and the child ticket. Finally, a recommendation process 312, recommends stand operating procedures for the ticket and executes scripts automatically to resolve the ticket.

Figure 4:
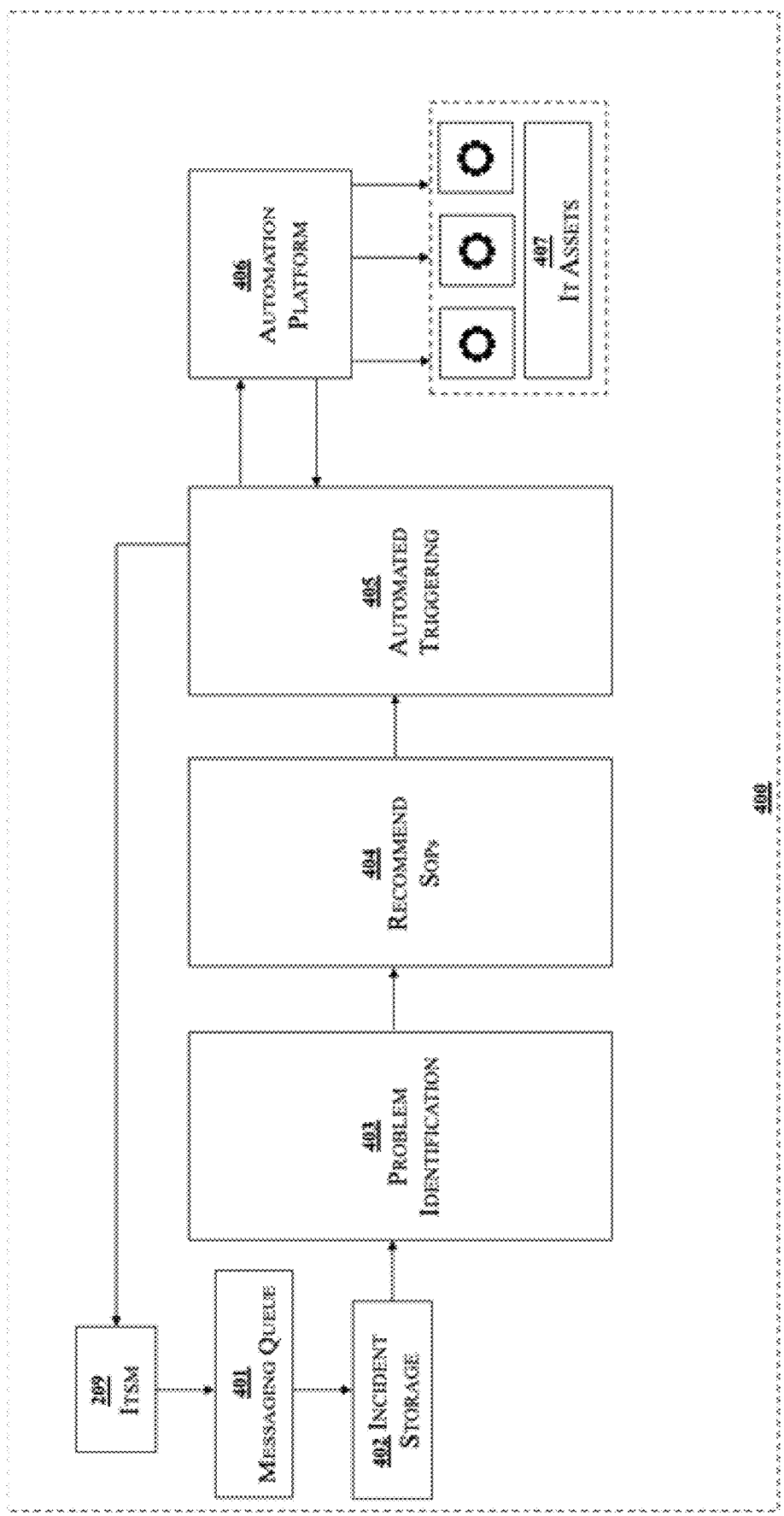
FIG. 4 is a diagram representing a system for ticket categorization, SOP recommendation and automated resolution.

FIG. 4 describes a system 400 for ticket categorization, SOP recommendation and automated resolution. The IT management system 209 receives the tickets from the ticketing unit 208 as in FIG. 2. The tickets are then passed to a messaging queue 401. An incident storage unit 402 receives the tickets and passes them onto a problem identification unit 403. The problem identification unit 403, performs categorization of the tickets into functional level C1 and technical level C2. The tickets are then passed on for resolution to recommendation unit 404. At 404, standard operating procedures are identified for the tickets and at 405, scripts for resolving the tickets are automatically triggered. The resolution is communicated to multiple IT assets 407 via an automation platform 406.

Figure 7:
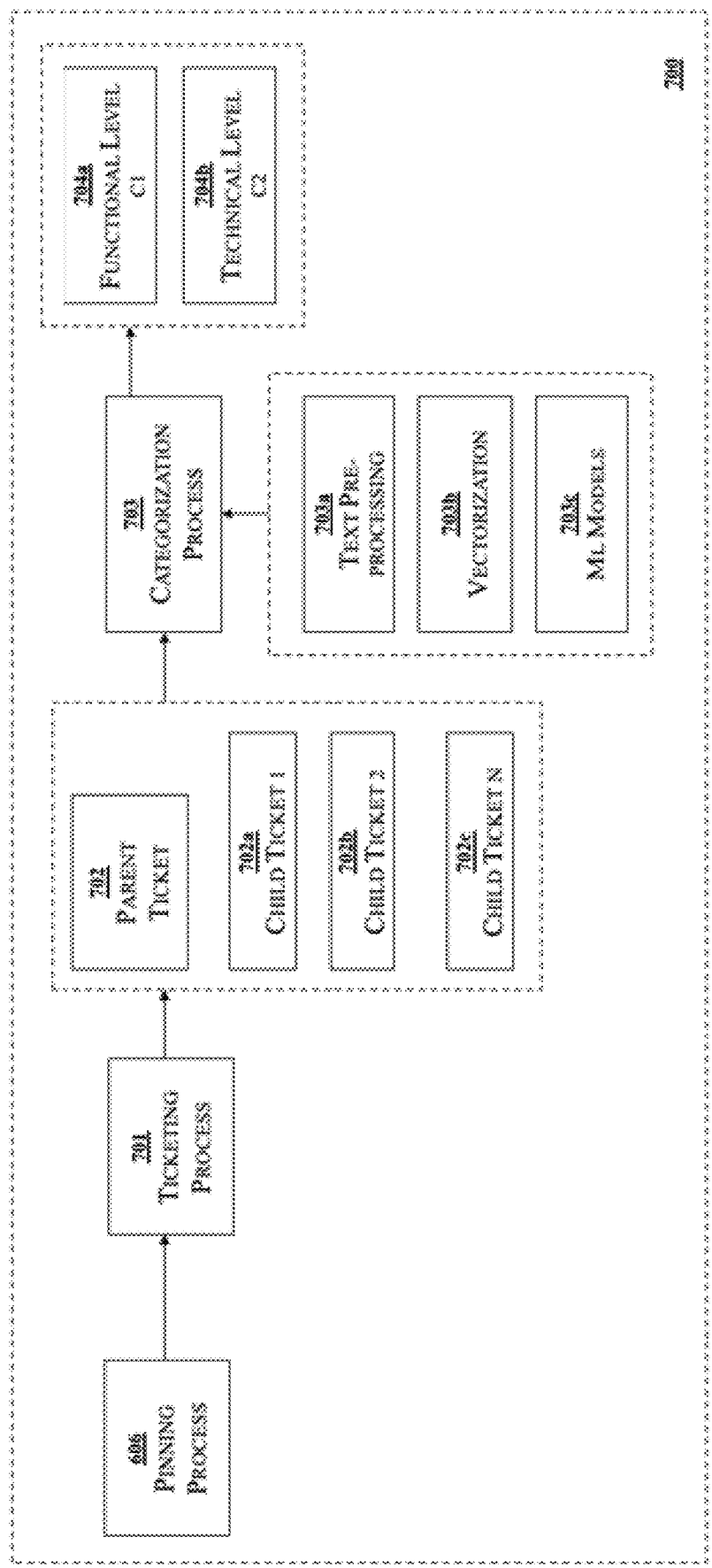
FIG. 7 represents a system for categorization of tickets.
Figure 7A:
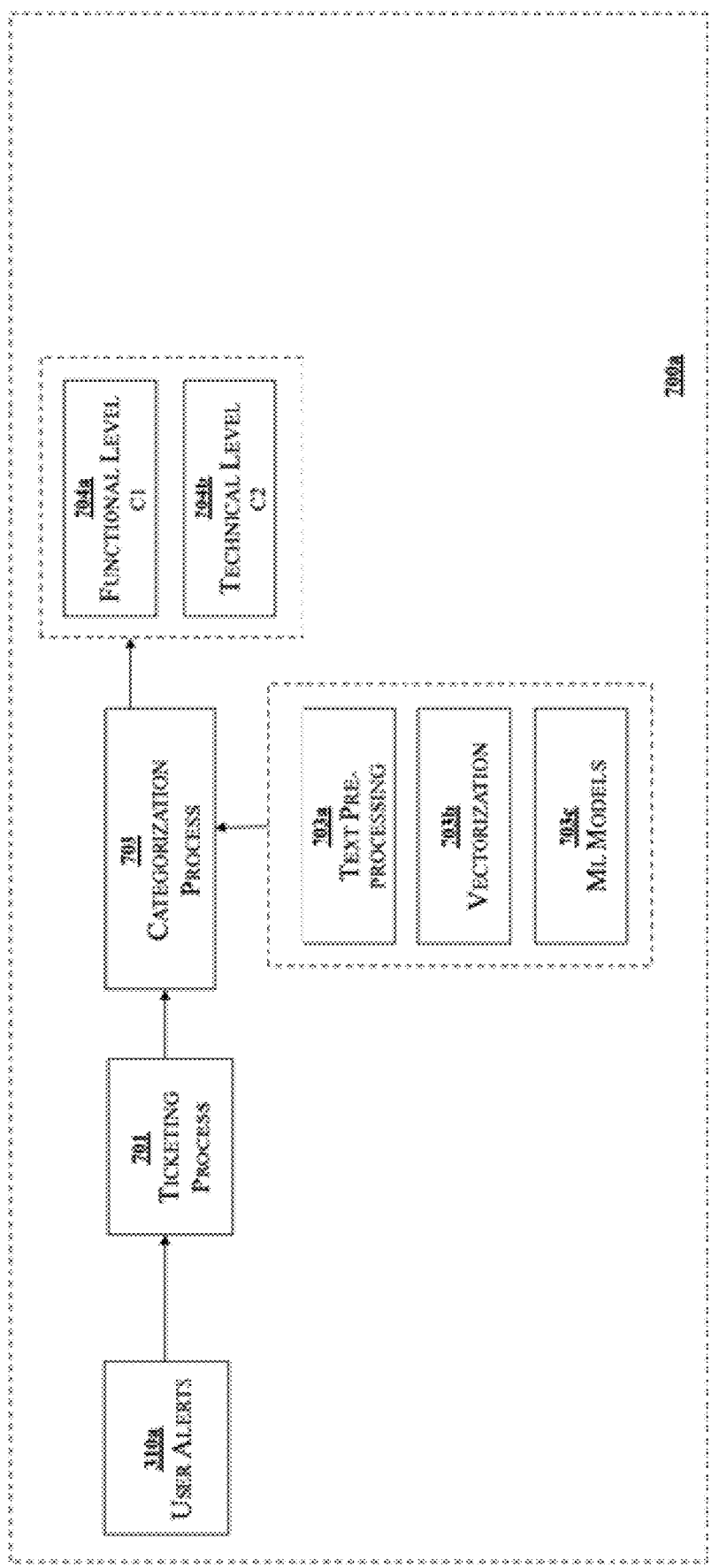
FIG. 7a represents a system for categorization of user tickets.

FIG. 7 describes a system 700 for categorization of tickets. After the pinning process 606, ticketing process 701 determines a parent ticket 702 and associated child tickets 702*a*, 702*b* and 702*c*. Then categorization process 703 takes over where functional level C1 704*a* and technical level C2 704*b* are determined. FIG. 7*a* describes a scenario 700*a* where the ticketing process 701 receives the user alerts 310*a* directly and the user alerts are converted to the user tickets.

In another embodiment, real time alert data is passed from monitoring tool to an alert determination system. An alert type column from the real time alert data is passed to a category prediction algorithm, where its normalized category is predicted, and this predicted category is assigned to the real time alert data. The category prediction algorithm is trained on historical alert data with its category as dependent variable and alert type as independent variable using Natural Language Processing in a supervised learning technique. Now this real time alert data is lookup with historical alert data to identify which of these historical alerts are related to a current alert. Based on normalized alert type of both alerts (real time and historic) their pattern associativity (i.e. Lift) is taken from a mined pattern. The mined pattern is mined from the historical data using data mining technique. A device relative distance is calculated from a topology data using Network analysis technique and difference between alert time is calculated in minutes. The pattern associativity (i.e. Lift), the device distance and the time difference are passed to a correlation algorithm to find their relationship. Output of the correlation algorithm is a probability (probability<threshold=non-related & probability>threshold=related) and ranking is done on the probability. The threshold is dynamically computed or configurable. Highest rank alerts are identified as related alerts and are passed to a parent pining process. In the parent pining process, a parent is identified based on its level in hierarchy, number of sub nodes in network topology, its type of device and generation of the alerts. After identifying the parent and the child, tickets are created in an external ITSM tool as a parent and a child ticket.

In another embodiment, a noise suppression engine suppresses redundant alerts by finding duplicates and computing correlation among huge number of infra alerts generated from different assets. Various system monitoring tools continuously monitor events generated from different assets like servers, routers, switches etc. If any event violates predefined business rules, then an alert is generated. This alert contains information such as time of generation, type of event (CPU, Disk, Memory etc.), name of associated asset and description of an event etc. The alerts are pushed to cognitive engine for further processing to suppress noise by finding potential contextual duplicate and establishing parent-child relationship among them. In order to achieve this, the engine performs certain pre-processing activities to standardize time value of the alerts as the assets may be situated at different locations around the globe, normalize alert type as different organizations contain different ways to name alert type. Normalization process contains a machine learning supervised predictive model which predicts the normalized alert type based on various raw alert information. Moreover, in advance the cognitive engine collects historical alerts, those are normalized, and these alerts are mined using pattern learning algorithm to extract associativity pattern among the alerts. Once the pre-processing is completed, each incoming alert is compared with stored recent past alerts based on a configurable time window. New attributes are extracted from this activity. The attributes are:

A) Generated time difference between alerts
B) Topological relationship among assets where raw information collected from Organization's Configuration Management Database (CMDB)
C) Associative probability from the extracted patterns based on the normalized alert types These three features are passed to an event correlation model which predicts whether the alerts are correlated or not a possible parent child relationship among the alerts. Where CMDB information is not available, from historical data, an advance deep learning framework intelligently determines the probability that two or more alerts occur together using alert occurrence pattern. Subsequently, it also computes and learns a threshold of the said probability score. Using this knowledge, the deep learning framework predicts likelihood weightage of co-occurrence for incoming alerts within a configurable time window. Thereafter, it computes a final correlation by comparing the predicted weightage with the learnt threshold. Once the parent-child relationship is established by above methodology, a parent alert is identified for primary incident ticket and child tickets are associated with parent for further processing.

With usage of large number of applications, an organization needs either manual or rule-based categorization approach to properly classify tickets and channelize them to correct support team. This involves both time and cost which directly impacts business. To address this issue, the cognitive engine offers AI based ticket categorization feature which intelligently performs functional and further granular level technical categorization based on the homogeneity among the tickets using various advanced machine learning techniques. The ticket can be generated either after converted from system generated alert or incident reported manually. In this regard, the cognitive engine uses supervised machine learning models which are trained on historically available ticket data over a period. Description of ticket is primarily used to train a classification model. Typically, these ticket descriptions contain a lot of bad/junk data in real life. Therefore, few text pre-processing steps such as removing stop words, punctuation and normalization of texts are performed on raw texts. This engine predicts 2 levels of ticket categories based on description of the ticket: Category 1 Functional level (C1—broader level i.e. affected area of the ticket) and Category 2 Technical level (C2—Granular level i.e. actual problem).

The organizations typically maintain various Standard Operating Procedures (SOP) as to smoothly operate IT operation. These documents contain collection of steps, which help to resolve a problem mentioned in an incident ticket. However, it is important to refer a correct SOP to resolve the problem. In order to do so, identifying problem area of the ticket is the first step. The ticket categorization helps to identify the problem area. Next step is to resolve the problem using correct SOP(s), which is recommended by another cognitive engine called SOP Recommendation. Output of this engine is to point out SOP for each combination of ticket categories (C1 &C2). The SOP recommendation engine needs following data points for learning purpose:

1. List of all SOPs (Standard operating procedure) of the organization in text format.
2. All possible historical ticket categories C1 & C2.
3. Description for each combination of Categories C1 & C2 (calling it as Category Description) consisting of following information:
   a. Elaboration of the problem defined by C1 & C2
   b. Impact of the problem
   c. Possible root cause for the problem As a part of text standardization, the SOP recommendation engine performs certain text pre-processing activities such as removing of stop word, punctuations, whitespaces, unwanted numeric etc. Thereafter it extracts context from category description to identify corresponding infrastructure or network devices or software application etc. and figures out SOP matching and mapping with the context. Subsequently, a corresponding resolution script is identified, required parameter information are extracted from the ticket & the SOP and the script is triggered automatically to resolve the problem.

Figure 5:
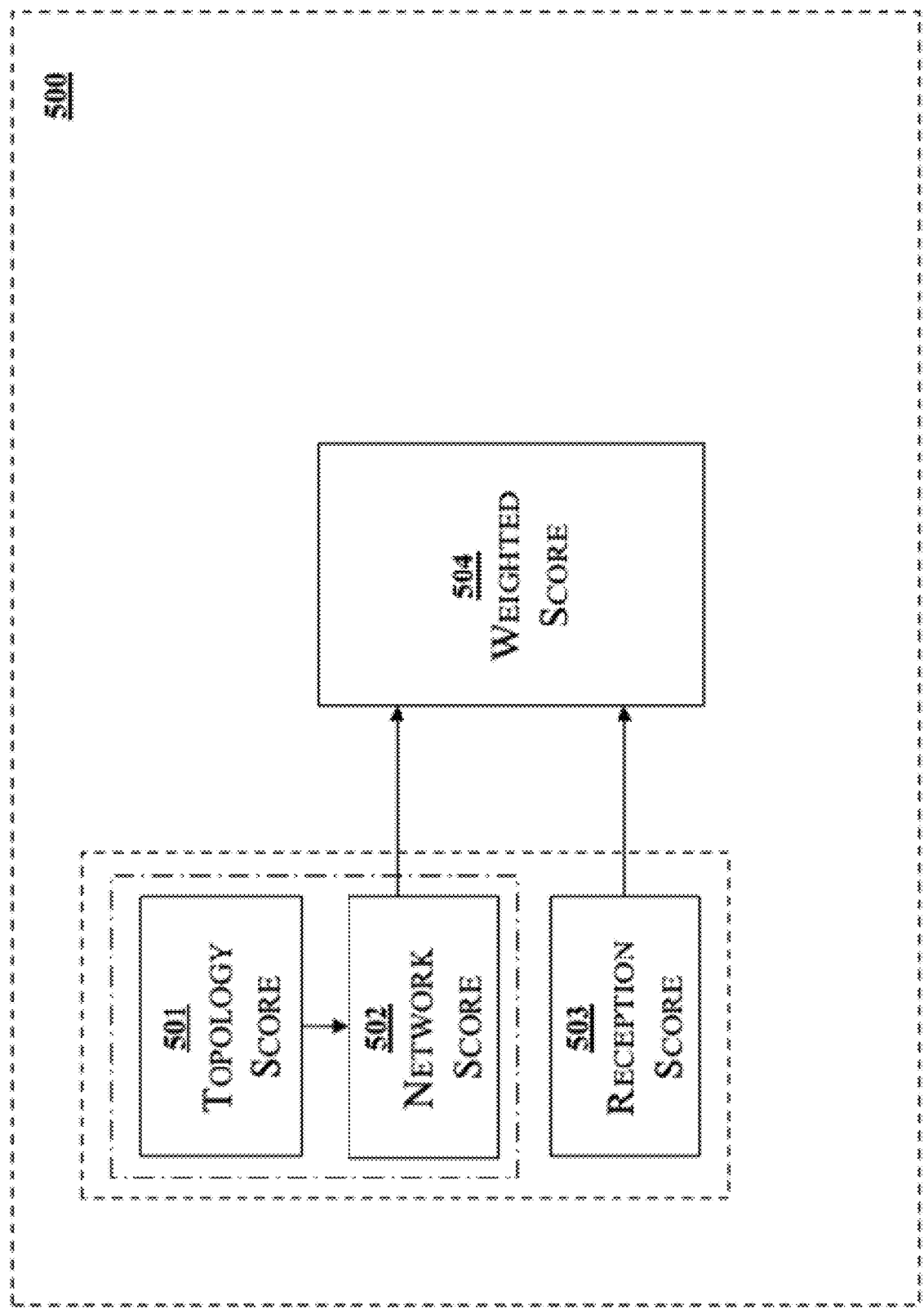
FIG. 5 is a diagram representing components of weighted score.
Figure 6:
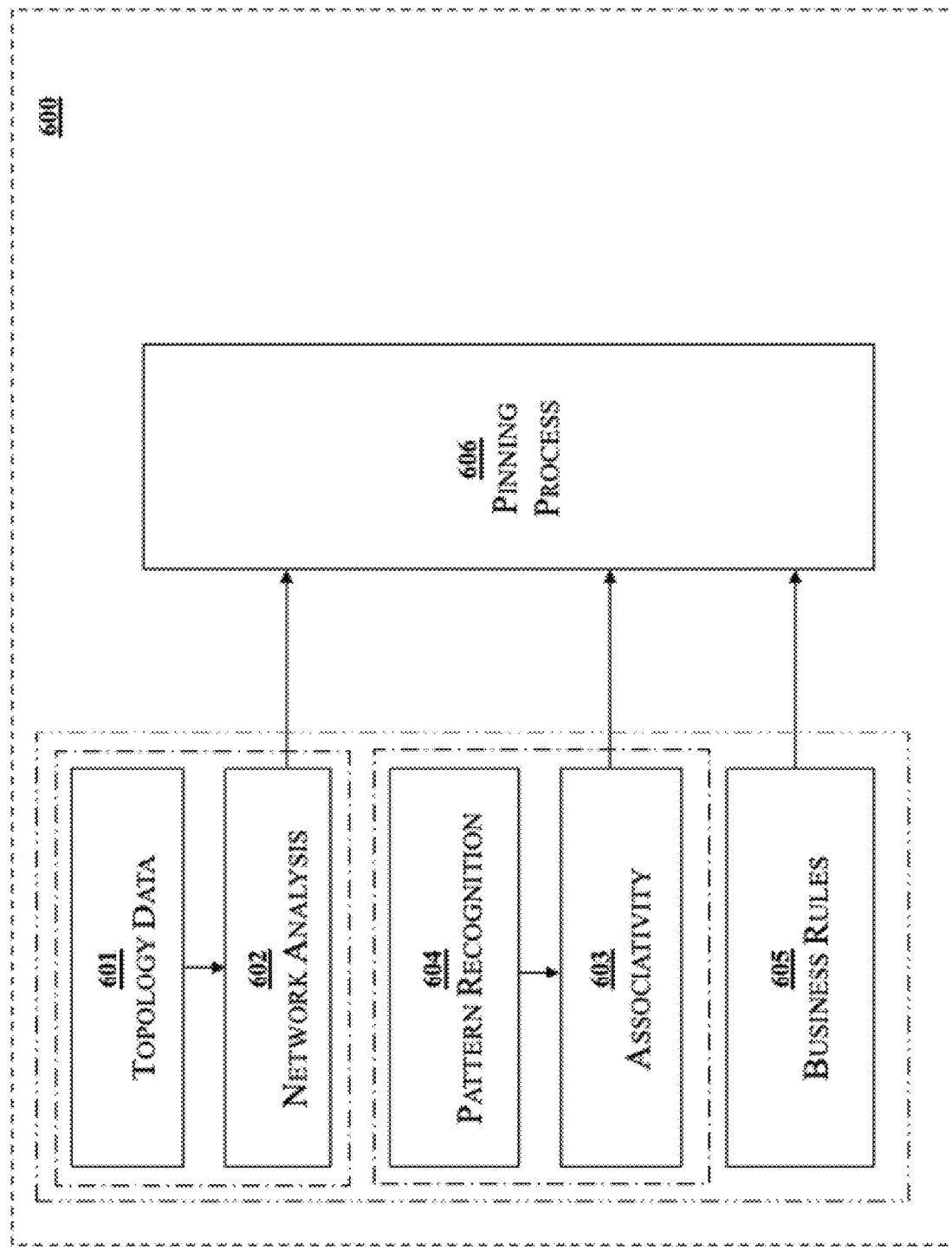
FIG. 6 represents components of pinning process.

FIG. 5 describes components 500 of weighted score 504. The weighted score comprises of network score 502 and reception score 503. The topology score 501 is calculated based on topology data 601. The network score 502 is calculated based on the topology score 501. The reception score 503 is calculated from time difference between alerts. Similarly, FIG. 6 describes components 600 of pinning process 606. The pinning process comprises of network analysis 602 derived from the topology data 601, associativity 603 derived from pattern recognition 604 and business rules 605.

In the present implementation, the system (100) includes one or more processors. The processor may be implemented as one or more microprocessors, microcomputers, microcontrollers, digital signal processors, central processing units, state machines, logic circuitries, and/or any devices that manipulate signals based on operational instructions. Among other capabilities, the at least one processor is configured to fetch and execute computer-readable instructions stored in the memory. The system further includes I/O interfaces, memory and modules.

The I/O interfaces may include a variety of software and hardware interfaces, for example, a web interface, a graphical user interface, and the like. The I/O interface may allow the system to interact with a user directly or through user devices. Further, the I/O interface may enable the system (100) to communicate with other user devices or computing devices, such as web servers. The I/O interface can facilitate multiple communications within a wide variety of networks and protocol types, including wired networks, for example, LAN, cable, etc., and wireless networks, such as WLAN, cellular, or satellite. The I/O interface may include one or more ports for connecting number of devices to one another or to another server.

The memory may be coupled to the processor. The memory can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the system (100) includes modules. The modules include routines, programs, objects, components, data structures, etc., which perform tasks or implement particular abstract data types. In one implementation, module includes a display module and other modules. The other modules may include programs or coded instructions that supplement applications and functions of the system (100).

As described above, the modules, amongst other things, include routines, programs, objects, components, and data structures, which perform particular tasks or implement particular abstract data types. The modules may also be implemented as, signal processor(s), state machine(s), logic circuitries, and/or any other device or component that manipulate signals based on operational instructions. Further, the modules can be implemented by one or more hardware components, by computer-readable instructions executed by a processing unit, or by a combination thereof.

Furthermore, one or more computer-readable storage media may be utilized in implementing some of the embodiments consistent with the present disclosure. A computer-readable storage medium refers to any type of physical memory on which information or data readable by a processor may be stored. Thus, the computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

We claim:

1. A method for determining alerts generated in a system, the method comprising:
   receiving a stream of alerts from a monitoring tool;
   fetching an alert type column from the stream of alerts wherein the alert type column is passed onto a categorization prediction algorithm to predict a normalized category for the alerts;
   identifying a relation based on a historical alert data for the stream of alerts;
   establishing a pattern associativity from the identified relation and the predicted normalized category; and
   calculating a probability based on the associativity on the stream of alerts, wherein the probability is associated to determine a ranking of the alerts.

2. The method as claimed in claim 1, wherein a topology score for the alerts is calculated from topology data.

3. The method as claimed in claim 2, wherein a network score/analysis for the alerts is calculated from the topology score.

4. The method as claimed in claim 1, wherein a reception score for the alert is calculated from time difference between alerts.

5. The method as claimed in claim 1, wherein a weightage score is calculated from the network score and the reception score.

6. The method as claimed in claim 5, wherein a ranking of the alerts is performed on basis of the probability and the weightage score.

7. The method as claimed in claim 1, wherein a pattern recognition is performed on the alerts to determine a pattern between the alerts and determining an associativity from the pattern recognition.

8. The method as claimed in claim 1, wherein a pinning process identifies at least one parent alert and one or more associated child alert.

9. The method as claimed in claim 8, wherein the pinning process includes a combination of a network analysis, the associativity and customized business rules.

10. The method as claimed in claim 1, wherein a ticketing process creates at least one parent ticket and one or more associated child ticket.

11. The method as claimed in claim 1, wherein a categorization process categorizes the parent ticket, the associated child ticket and any incident ticket which are manually reported into a functional level and further into a technical problem area level.

12. The method as claimed in claim 1, wherein the categorization process includes text pre-processing, vectorization and ensemble of machine learning models.

13. The method as claimed in claim 1, wherein a recommendation process recommends standard operating procedures.

14. The method as claimed in claim 13, wherein the recommendation process triggers scripts automatically.

15. The method as claimed in claim 13, wherein the recommendation process includes automated identification of ticket parameters for mapping to corresponding scripts.

16. The method as claimed in claim 13, wherein the recommendation process includes contextual analysis of tickets to identify corresponding infrastructure or network devices or software applications.

17. A system for determining alerts generated in a system, the system comprising:
   a receiver receiving a stream of alerts from a monitoring tool;
   a normalizing unit receiving an alert type column from the stream wherein a categorization prediction algorithm is applied to predict a normalized category for the alerts;
   a relationship unit to identify a relation by looking up the stream of alerts with historical alert data, wherein the relationship unit is determining a pattern associativity from the relation and the normalized category; and
   a probability unit calculating a probability based on the pattern associativity on the stream of alerts and determining ranking of the alerts.

18. The system as claimed in claim 17, wherein a topology score for the alerts is calculated from topology data.

19. The system as claimed in claim 18, wherein a network score/analysis for the alerts is calculated from the topology data.

20. The system as claimed in claim 17, wherein a reception score for the alerts is calculated from a time difference between alerts.

21. The system as claimed in claim 17, wherein a weightage score is calculated from a network score and the reception score.

22. The system as claimed in claim 21, wherein ranking of the alerts is performed on basis of the probability and the weightage score.

23. The system as claimed in claim 17, wherein a pattern recognition is performed on the alerts to determine a pattern between the alerts and determining an associativity from the pattern recognition.

24. The system as claimed in claim 17, wherein a hierarchical unit performs functions on a network analysis, the associativity and customized business rules to determine at least one parent alert and one or more associated child alert.

25. The system as claimed in claim 17, wherein a ticketing unit creates at least one parent ticket and one or more associated child ticket.

26. The system as claimed in claim 17, wherein a categorization unit performs text pre-processing, vectorization and ensemble of machine learning models on the parent ticket, the associated child ticket and any incident ticket which are manually reported to categorize into a functional level and further into technical problem area level.

27. The system as claimed in claim 17, wherein a recommendation unit recommends standard operating procedures.

28. The system as claimed in claim 27, wherein the recommendation unit triggers scripts automatically.

29. The system as claimed in claim 27, wherein the recommendation unit performs automated identification of ticket parameters for mapping to corresponding scripts.

30. The system as claimed in claim 27, wherein the recommendation unit performs contextual analysis of tickets to identify corresponding infrastructure or network devices or software applications.

* * * * *